(12) United States Patent
Willauer et al.

(10) Patent No.: US 8,857,454 B2
(45) Date of Patent: Oct. 14, 2014

(54) VALVING SYSTEM AND METHOD OF SELECTIVELY HALTING INJECTION OF CHEMICALS

(75) Inventors: Darrin L. Willauer, The Woodlands, TX (US); Jesse J. Constantine, Kingwood, TX (US); Walter S. Going, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 219 days.

(21) Appl. No.: 13/022,229

(22) Filed: Feb. 7, 2011

(65) Prior Publication Data

US 2011/0192480 A1    Aug. 11, 2011

Related U.S. Application Data

(60) Provisional application No. 61/302,410, filed on Feb. 8, 2010, provisional application No. 61/302,503, filed on Feb. 8, 2010.

(51) Int. Cl.
| | |
|---|---|
| *F16K 11/20* | (2006.01) |
| *F16K 17/14* | (2006.01) |
| *F16K 17/40* | (2006.01) |
| *E21B 34/00* | (2006.01) |
| *E21B 34/10* | (2006.01) |
| *F17D 1/00* | (2006.01) |
| *F17D 3/00* | (2006.01) |
| *F16K 3/26* | (2006.01) |
| *E21B 34/06* | (2006.01) |

(52) U.S. Cl.
CPC .................. *F16K 11/20* (2013.01); *F16K 3/262* (2013.01); *E21B 34/06* (2013.01)
USPC ............ 137/1; 137/68.17; 137/637; 166/319; 166/375

(58) Field of Classification Search
USPC ............... 137/637, 606, 607, 68.16, 68.17, 1; 166/319, 375
See application file for complete search history.

(56) References Cited

U.S. PATENT DOCUMENTS

| 3,373,762 | A | * | 3/1968 | Korchak | 137/240 |
| 3,981,360 | A | * | 9/1976 | Marathe | 166/317 |
| 3,993,100 | A | * | 11/1976 | Pollard et al. | 137/628 |

(Continued)

FOREIGN PATENT DOCUMENTS

EP    1259709 B1    12/2006

OTHER PUBLICATIONS

D. Klompsma et al., "The Development of a Complete System to Allow Continuous Downhole Chemical Injection Without Affecting the Subsurface and Surface Safety Systems"; Society of Petroleum Engineers, SPE Paper No. 132659; Oct. 18, 2010.

(Continued)

*Primary Examiner* — Stephen M Hepperle
*Assistant Examiner* — Michael R Reid
(74) *Attorney, Agent, or Firm* — Cantor Colburn LLP

(57) ABSTRACT

A valving system includes, a plurality of flow control valves, and a plurality of chemical control valves in operable communication with a plurality of the plurality of flow control valves such that each of the plurality of chemical control valves is actuated between closed and open positions when the flow control valve it is in operable communication with is actuated between closed or open positions.

11 Claims, 3 Drawing Sheets

(56) References Cited

U.S. PATENT DOCUMENTS

| | | |
|---|---|---|
| 4,194,524 A | 3/1980 | Wicke |
| 6,109,286 A | 8/2000 | Johnston |
| 7,377,322 B2 | 5/2008 | Hofman |
| 2003/0056955 A1* | 3/2003 | Watson .................. 166/305.1 |
| 2008/0029163 A1 | 2/2008 | Lauderdale |
| 2009/0283276 A1* | 11/2009 | Mandrou et al. .............. 166/375 |
| 2009/0294123 A1 | 12/2009 | Mescall et al. |
| 2010/0096127 A1 | 4/2010 | Jordy |
| 2010/0101788 A1 | 4/2010 | Mennem et al. |
| 2011/0079398 A1 | 4/2011 | Patel et al. |

OTHER PUBLICATIONS

Ricardo Tirado, "Hydraulic Intelligent Well Systems in Subsea Applications: Options for Dealing with Limited Control Line Penetrations"; Society of Petroleum Engineers, SPE Paper No. 124705; Oct. 4, 2009.

International Search Report and Written Opinion for International Application No. PCT/US2012/037899; International Filing Date: Apr. 15, 2012; Date of mailing: Nov. 28, 2012; 9 pages.

* cited by examiner

VALVING SYSTEM AND METHOD OF SELECTIVELY HALTING INJECTION OF CHEMICALS

CROSS REFERENCE TO RELATED APPLICATIONS

This. Application is a nonprovisional Application of U.S. Provisional Patent Application No. 61/302,503, filed Feb. 8, 2010 and U.S. Provisional Patent Application No. 61/302,410 filed Feb. 8, 2010, the entire contents of which are incorporated herein by reference.

BACKGROUND

Tubular systems for transporting fluids often incorporate remotely operated valves. In fields, such as hydrocarbon recovery Carbon. Dioxide sequestration, etc. for example, such remotely controlled valves are employed to control downhole flows. Such valves are placed within producing zones to allow control and shutin of producing zones within a well. In many cases a well may have multiple producing zones such that multiple flow control valves are used to balance production, optimize production and shut off particular zones. These downhole valves use hydraulic lines that run between the valves and surface so that an individual can remotely operate the valves.

In some wells, downhole chemical injection systems are run to supply various chemicals to prevent scaling, foaming, asphaltine deposition and other undesirable events from occurring. In the case where downhole flow control valves are used, each zone may have a separate chemical injection valve associated with it. In a few instances the wellhead may have a sufficient number of wellhead penetrations to accommodate a separate injection line to each chemical injection valve. In most cases, however, the chemical injection valves must be run on a common injection line. In such cases all of the chemical injection valves provide chemicals whenever chemical injection is taking place. These systems can waste chemicals and damage the formation by causing precipitates to form. Systems and methods to address the foregoing drawbacks are well received in the art.

BRIEF DESCRIPTION

Disclosed herein is a valving system. The system includes, a plurality of flow control valves, and a plurality of chemical control valves in operable communication with a plurality of the plurality of flow control valves such that each of the plurality of chemical control valves is actuated between closed and open positions when the flow control valve it is in operable communication with is actuated between closed or open positions.

Further disclosed herein is a method of selectively halting injection of chemicals. The method includes, injecting chemicals through a chemical control valve, closing a flow control valve, and closing the chemical control valve via operational communication between the flow control valve and the chemical control valve.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
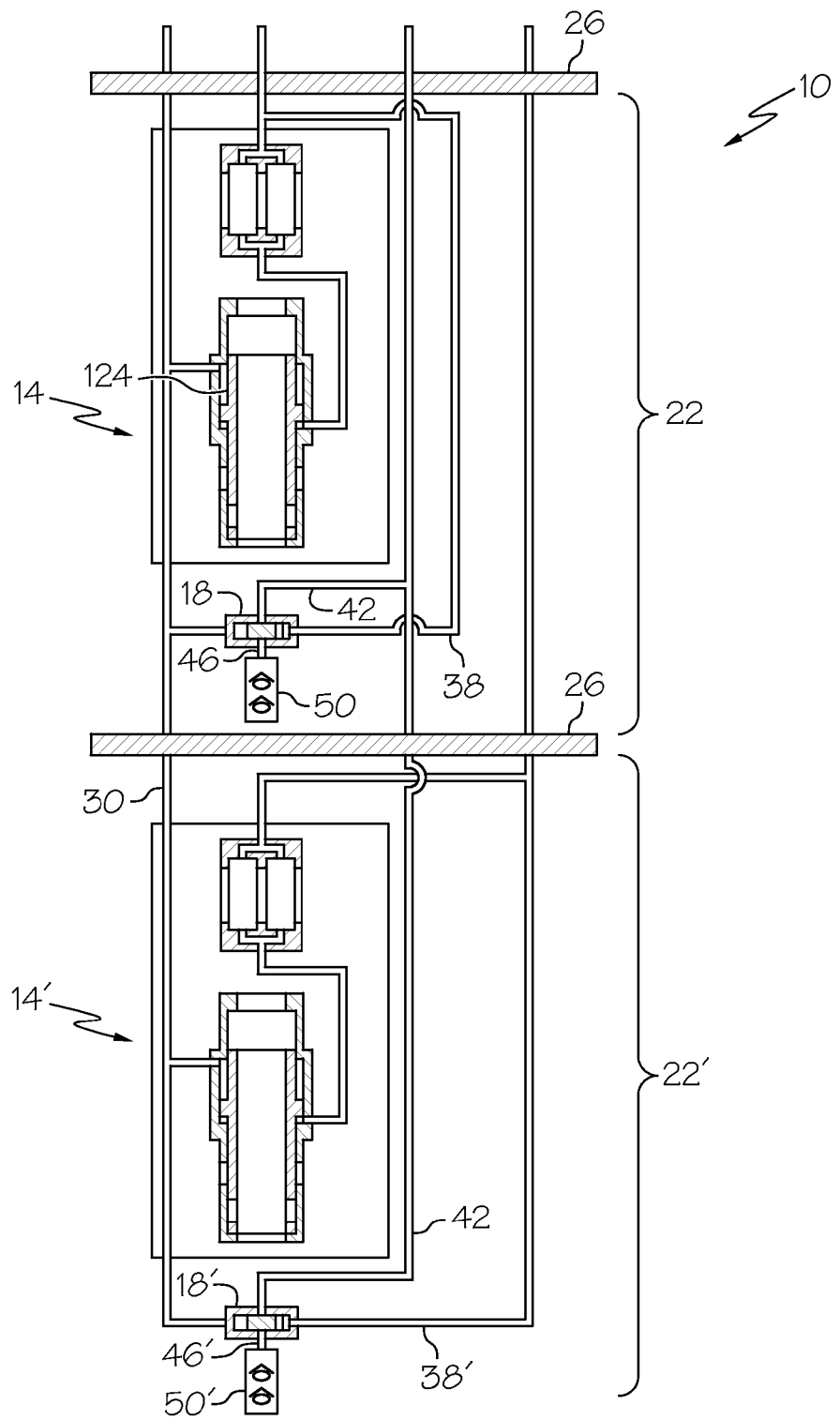
FIG. 1 depicts a schematic view of a valving system disclosed herein.

Referring to FIG. 1, an embodiment of a valving system disclosed herein is illustrated at 10. The valving system 10 includes, a plurality of flow control valves 14, 14' and a plurality of chemical control valves 18, 18' in operable communication with the plurality of flow control valves 14, 14', with two of each valve 14, 14', 18, 18' being illustrated in this embodiment, although any number of valves 14, 14', 18, 18' are contemplated. Each of the chemical control valves 18, 18' is in operable communication with one of the flow control valves 14, 14' such that the chemical control valve 18, 18' is actuated whenever the flow control valve 14, 14' with which the chemical control valve 18, 18' is in operable communication is actuated. As such, when the flow control valve 14 is actuated, either from open to closed or from closed to open, the chemical control valve 18 is also actuated. Additionally, in this embodiment, the actuation of the chemical control valve 18 is in a same direction as the actuation of the flow control valve 14. That is, if the flow control valve 14 moves from an open position to a closed position the chemical control valve 18 also moves from an open position to a closed position, and vice versa. It should be noted that inverse operable communication is also contemplated for alternate embodiments.

In some. Applications of the valving system 10, such as a downhole hydrocarbon recovery. Application, for example, it may be desirable to stop production from one zone while leaving other zones open. In such an. Application it may also be desirable to cease injecting chemicals into the zone no longer producing to prevent causing potential damage to the formation that can result from the injection of chemicals, such as the formation of precipitates, for example. The embodiments disclosed herein address this concern by stopping the injection of chemicals, via closing of the chemical control valves 18, 18', whenever the flow control valve 14, 14' in a particular zone is closed. In this example, zones 22, 22' are isolated from one another by packers 26.

In the embodiment of FIG. 1, the valves 14, 14', 18, 18' are actuated by fluidic pressure supplied through various hydraulic control lines. A common close hydraulic control line 30 is fluidically connected to all four valves 14, 14', 18 and 18'. A separate open hydraulic control line 38, 38' is run into each of the zones 22, 22' respectively, and is split within each zone 22, 22' to simultaneously supply hydraulic pressure to both the flow control valve 14, 14' and the chemical control valve 18, 18' within each zone 22, 22'. Pressure differences between the close line 30 and each of the open lines 38, 38' is used to actuate the valves 14, 14', 18 and 18'. If pressure in the open line 38, 38' is greater than pressure in the close line 30, the valves 14, 14', 18, 18' will move to open or remain open, depending upon the current positions thereof. Conversely, if the pressure in the close line 30 is greater than pressure in the open line 38, 38', the valves 14, 14', 18, 18' will close or remain closed, depending upon the current positions thereof.

The foregoing system allows each chemical control valves 18, 18' to be opened or closed independently from each of the other chemical control valves 18, 18' via pressure supplied to each through the independent open lines 38 and 38'.

Figure 2:
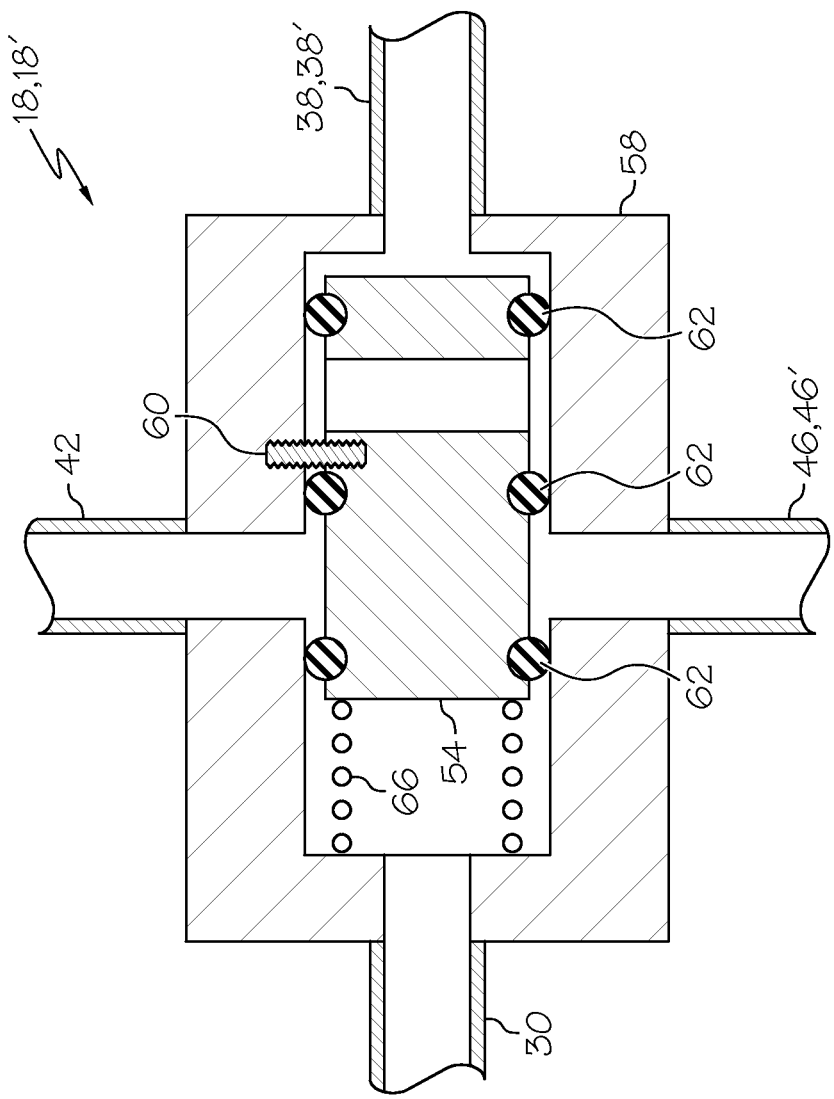
FIG. 2 depicts a cross sectional view of a chemical control valve employed in the valving system of FIG. 1.

Referring to FIG. 2, in addition to the hydraulic lines 30, 38, 38', each of the chemical control valves 18, 18' has two chemical lines 42, 46 and 42, 46' fluidically connected thereto. The chemical supply line 42 is a common line that provides chemical to each of the chemical control valves 18, 18'. The chemical injection lines 46, 46' fluidically connect each chemical control valve 18, 18' to a chemical injection valve 50, 50' (shown in FIG. 1 only). Each of the chemical injection valves 50, 50' allows chemical supplied thereto to exit to the location requiring chemical injection and may be configured as a one-way valve biased toward a normally closed position.

The chemical control valves 18, 18', in the instant embodiment each have a piston 54 sealingly movable within a housing 58 by seals 62. The piston 54 is movable between a closed position (shown with the piston moved rightward in the figure), and an open position (wherein the piston 54 would be moved in a leftward direction in the FIGURE). When each of the valves 18, 18' is open, the chemical lines 42 and 46 or 46' of that respective valve 18, 18' are fluidically connected to one another. Conversely, when each of the valves 18, 18' are closed, there is no fluidic communication between the chemical lines 42 and 46 or 46' of that respective valve 18, 18'.

An optional biasing member 66, shown as a compression spring, can be used to bias the piston 54 toward one position or the other, such that a pressure differential greater than a threshold value between the lines 30 and 38, 38' is needed before the chemical control valve 14, 14' is actuated. Alternately, frictional engagement of the piston 54 within the housing 58 can be used to maintain the piston 54 in its current position until a selected pressure differential is provided to cause actuation. Optionally, a release member 60, illustrated herein as a shear screw, could also be employed to maintain the piston 54 in its initial position until sufficient force to shear the shear screw 60 is applied to actuate the chemical control valve 14, 14'.

Figure 3:
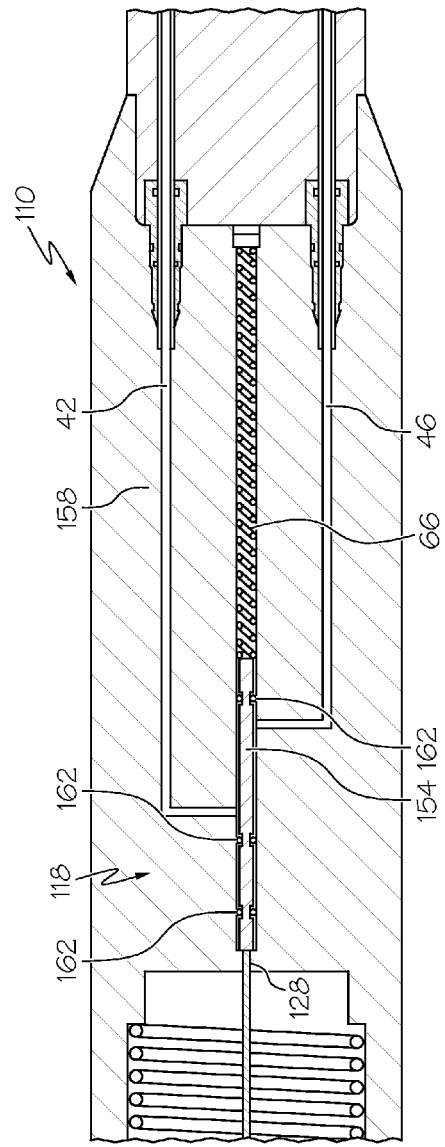
FIG. 3 depicts a partial cross sectional view of an alternate embodiment of a chemical control valve disclosed herein in an open position.
Figure 4:
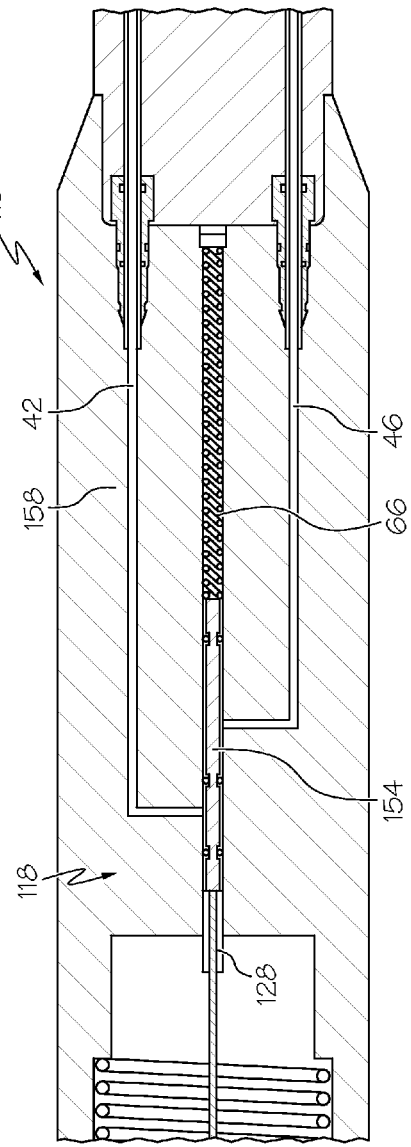
FIG. 4 depicts a partial cross sectional view of the embodiment of a chemical control valve of FIG. 3 shown in a closed position.

Referring to FIGS. 3 and 4, an alternate embodiment of a portion of a valving system disclosed herein is illustrated generally at 110. The portion of the valving system 110 illustrated is a chemical control valve 118. Unlike the chemical control valves 18, 18', the chemical control valve 118 is not actuated by hydraulic pressure. Instead, the chemical control valve 118 is actuated via direct mechanical linkage with the flow control valve 14. A piston 154 of the valve 118 is sealably movable within a housing 158 via seals 162. The piston 154 is moved via movement of a sleeve 124 of the flow control valve 14, 14' (shown only in FIG. 1) and a connecting rod 128 (shown only in FIGS. 3 and 4). When the sleeve 124, rod 128 and piston 154 are in an uphole position, for example, as in the hydrocarbon recovery. Application discussed above (and as shown in FIG. 3), the flow control valve 14 is open and the chemical control valve 118 is open and chemical lines 42, 46 are fluidically connected. Conversely, when the sleeve 124, rod 128 and piston 154 are in a downhole position (as shown in FIG. 4), the flow control valve 14 and the chemical control valve 118 is closed and chemical lines 42 and 46 are not in fluidic communication.

Additionally, the embodiment of FIGS. 3 and 4 includes the biasing member 66, illustrated as a compression spring, that biases the chemical control valve 118 toward an open position (leftward in the FIGUREs). As such, the spring 66 maintains the piston 154 in the leftward position until it is contacted by the connecting rod 128, which can then force the piston 154 rightward. This allows the connecting rod 128 and sleeve 124 connecting thereto to have a greater stroke length than that of the piston 154 since the piston 154 need only move during the last potion of movement of the connecting rod 128 after contact therebetween is established.

The chemical control valve 118, by being mechanically coupled to the sleeve 124 of the flow control valve 14, is more integrated into the flow control valve 14, than are the chemical control valves 18, 18'. In other embodiments this integration could be taken further by integrating the chemical control valve directly into the flow control valve. For example, the chemical control valve could be incorporated into the sleeve 124 directly by using the sleeve 124 in place of the piston 154. In this system the seals 162 would seal the sleeve 124 to the housing 158 and the chemical lines 42 and 46 could fluidically connect to an annular cavity surrounding the sleeve 124.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed:

1. A valving system, comprising:
   a plurality of flow control valves;
   a plurality of chemical control valves in operable communication with a plurality of the plurality of flow control valves such that each of the plurality of chemical control valves is actuated between closed and open positions when the flow control valve with which it is in operable communication is actuated between closed or open positions;
   at least one close line in operable communication with a plurality of the plurality of flow control valves and a plurality of the plurality of chemical control valves such that pressure supplied via the at least one close line causes the plurality of the plurality of flow control valves and the plurality of the plurality of chemical control valves to close; and
   a common chemical supply line configured to supply chemical to the plurality of chemical control valves.

2. The valving system of claim 1, wherein each of a plurality of the plurality of flow control valves is actuatable by pressure supplied via at least one open line and the chemical control valve in operable communication therewith is also actuatable by pressure supplied via the same at least one open line.

3. The valving system of claim 2, wherein at least one of the at least one close line and the at least one open line are hydraulic control lines.

4. The valving system of claim 1, further comprising a chemical injection valve in operable communication with each of the plurality of chemical control valves.

5. The valving system of claim 1, wherein each of the plurality of chemical control valves is integrated into the flow control valve in operable communication therewith.

6. The valving system of claim 1, wherein a retention feature maintains each of the plurality of chemical control valves in its current position until forces exceeding threshold forces act upon the chemical control valve to actuate it from its current position.

7. The valving system of claim 1, wherein a release mechanism maintains each of the plurality of chemical control valves in its initial position until forces sufficient to release the release mechanism are encountered by the release mechanism.

8. The valving system of claim 1, wherein the plurality of chemical control valves move between the closed and open positions in a same direction as the flow control valve that each chemical control valve is in operational communication with.

9. A method of selectively halting injection of chemicals comprising:
   supplying chemicals to a plurality of chemical control valves via a common chemical supply line;
   injecting chemicals through the plurality of chemical control valves;
   closing a plurality of flow control valves with pressure supplied via a close line; and
   closing a plurality of the plurality of chemical control valves with pressure supplied via the close line.

10. The method of selectively halting injection of chemicals of claim 9, wherein the close line is a hydraulic control line.

11. The method of selectively halting injection of chemicals of claim 9, further comprising injecting chemicals through the plurality of the chemical control valves and selectively closing at least one of the plurality of the chemical control valves via the closing of one of the plurality of flow control valves in operational communication with the plurality of chemical control valves.

* * * * *